United States Patent [19]

Mueller et al.

[11] Patent Number: 4,486,577

[45] Date of Patent: Dec. 4, 1984

[54] STRONG, SILICONE CONTAINING POLYMERS WITH HIGH OXYGEN PERMEABILITY

[75] Inventors: Karl F. Mueller, New York; Sonia J. Heiber, Bedford Hills; Walter L. Plankl, Yorktown Heights, all of N.Y.

[73] Assignee: Ciba-Geigy Corporation, Ardsley, N.Y.

[21] Appl. No.: 433,743

[22] Filed: Oct. 12, 1982

[51] Int. Cl.³ ............................................ C08F 283/00
[52] U.S. Cl. ................................. 525/474; 351/160 R; 351/160 H; 528/24; 528/26; 528/28; 525/479
[58] Field of Search ............................ 528/24, 26, 28; 525/474, 479; 351/160 R, 160 H

[56] References Cited

U.S. PATENT DOCUMENTS

| | | | |
|---|---|---|---|
| 3,179,622 | 4/1965 | Halusta | 528/28 |
| 3,483,240 | 12/1969 | Boudreau | 528/28 |
| 4,130,708 | 12/1978 | Friedlander et al. | 528/28 |
| 4,136,250 | 1/1979 | Mueller et al. | 528/29 |
| 4,152,508 | 5/1979 | Ellis et al. | 526/279 |
| 4,153,641 | 5/1979 | Deichert et al. | 526/264 |
| 4,189,546 | 2/1980 | Deichert et al. | 528/26 |
| 4,195,030 | 3/1980 | Deichert et al. | 556/439 |
| 4,208,362 | 6/1980 | Deichert et al. | 264/1.7 |
| 4,208,506 | 6/1980 | Deichert et al. | |
| 4,217,038 | 8/1980 | Letter et al. | 351/160 R |
| 4,254,248 | 3/1981 | Friends et al. | 526/279 |
| 4,259,467 | 3/1981 | Keogh et al. | 528/279 |
| 4,260,725 | 4/1981 | Keogh et al. | 526/279 |
| 4,276,402 | 6/1981 | Chromecek et al. | 526/264 |
| 4,277,595 | 7/1981 | Deichert et al. | 528/26 |
| 4,341,889 | 7/1982 | Deichert et al. | 528/25 |
| 4,355,147 | 10/1982 | Deichert et al. | 528/24 |

FOREIGN PATENT DOCUMENTS 2067213 7/1981 United Kingdom .

*Primary Examiner*—Melvyn I. Marquis
*Attorney, Agent, or Firm*—Luther A. R. Hall

[57] ABSTRACT

Clear, strong, crosslinked polymers are described, which are obtained by copolymerization of (A) 8–70% of a linear or branched polysiloxane of 400–100,000 molecular weight (MW) containing at least two terminal or pendant, polymerizable, vinyl groups per each 5000 MW unit of polysiloxane and which are attached to the polysiloxane through at least two urethane, thiourethane, urea or amide linkages and (B) 30–92% of a mono- or divinyl compound or a mixture of such monomers consisting of 85 to 100% of water insoluble monomers. These polymers are useful in the preparation of hard or soft contact lenses.

28 Claims, No Drawings

STRONG, SILICONE CONTAINING POLYMERS WITH HIGH OXYGEN PERMEABILITY

BACKGROUND OF THE INVENTION

This invention pertains to clear, strong, crosslinked polymers, obtained by the copolymerization of (A) a linear or branched polysiloxane macromer containing at least two terminal or pendant, polymerizable vinyl groups attached to the polysiloxane by way of a urethane, thiourethane, urea or amide moiety; and (B) a vinyl or divinyl monomer or mixture of monomers, said monomers consisting of 85 to 100% of water insoluble monomers, which polymers are useful in the preparation of soft or hard contact lenses, particularly the hard lenses.

Contact lenses fall into two main categories, normally called "hard" and "soft", but which are better distinguished by the mode in which they are fitted to the eye. Hard lenses are rather loosely fitted to facilitate tear-liquid exchange between lens and cornea; they do this by their "rocking-chair" motion, by which they continuously pump tear liquid out from the space between lens and eye surface. Such tear-liquid exchange is the only way by which all important oxygen is supplied to the cornea of the wearers of conventional hard contact lenses made from polymethyl methacrylate (PMMA). Although hard PMMA lenses are, at least initially, uncomfortable and irritating for the wearer because the blinking eyelid hits a hard edge, they are nevertheless popular because they can be made with great precision by lathing and polishing. This is especially important for the correction of astigmatism with lenses of asymmetric design. Another advantage is that they are very easy to keep clean, requiring no sterilization.

Soft contact lenses on the other hand adhere closely the cornea and are therefore much more comfortable for the wearer; since they allow only limited tear liquid exchange they have to possess oxygen permeability high enough to prevent damage to the eye even if they are worn only for several hours. In all commercial soft lenses this $O_2$-permeability is a function of their water-content, that is their hydrogel nature. In addition, water acts as a plasticizer, which gives the lens its softness and the necessary hydrophilicity which allows it to swim and rotate on the cornea, rather than stick to it. Sticking to the cornea is the main problem with hydrophobic soft lenses, such as the otherwise very attractive silicone-rubber lens. Although hydrogel soft lenses represent progress in comfort, precision is compromised since some distortions due to water swelling are unavoidable; because they tend to rotate on the eye, astigmatism is also a much more difficult problem to solve. In addition, protein adsorption and disinfection are major concerns and the gain in comfort is to a great extent balanced by the greater inconvenience of more sophisticated lens-care procedures.

The next major development in contact-lens technology was the manufacture of lenses to be worn continuously, day and night, for up to several weeks. Oxygen permeability of the lens has to be increased manyfold for this purpose since in the closed-eye condition during sleep all the oxygen is supplied to the cornea from the blood-transfused eyelid. Among the several approaches which have not succeeded satisfactorily in this respect are: (1) high water-content hydrogels with up to 70% water; their drawback is mechanical weakness; because of this they have to be made thicker and $O_2$-permeability is accordingly reduced; and (2) silicone rubber lenses, which have consistently failed because of their extreme hydrophobicity; they adhere like a suction cup to the cornea and have led to serious eye damage. Attempts to make the surface of silicone-rubber lenses hydrophilic enough to prevent this have not been overly successful, mostly because the treated surface region is too thin to be permanent. For instance, the lenses produced by DOW CORNING under the Trade name SILCON and SILSOFT are treated to form a —Si—OH surface layer which is, however, so thin that it is easily abraded, especially in a hard lens. It is an embodiment of this invention to provide a silicone containing hard lens whose surface is permanently wettable. Another disadvantage of 100% silicone rubber contact lenses is the difficulty with which the edges can be finished and polished and thereby made comfortable to the wearer; this is inherent in all too rubbery materials. It is a further embodiment of this invention to provide silicone containing polymeric materials which range from "soft" to "hard"—using contact-lens terminology—but which are all easily polishable.

Recent examples of silicone containing hydrophobic polymers are described in U.S. Pat. Nos. 4,153,641, 4,189,546 and 4,195,030, and they consist of polymerized or copolymerized high-molecular weight polysiloxane or polyparaffin-siloxane diacrylates and methacrylates. The resulting polymers are hydrophobic. U.S. Pat. No. 4,217,038 describes a surface treatment to render their surface hydrophilic. Other polysiloxanes containing contact lens materials are described in U.S. Pat. Nos. 4,208,362; 4,208,506; 4,254,248; 4,259,467; 4,277,595; 4,260,725 and 4,276,402. All these patents are based on bis-methacrylate esters of linear polysiloxanes-diols. Because of the soft nature of linear polysiloxanes, they are not suited to make the hard, stiff materials necessary for a hard contact lens. U.S. Pat. No. 4,136,250 in addition to the above mentioned bis-methacrylates of linear polysiloxane-diols also discloses bis- and tris-methacrylates of diols and triols in which the functional groups are pendant, not terminal, to the main polysiloxane chain, and in addition compounds which are connected to the polysiloxane through bisurethane linkages. All compositions are, however, hydrogels and as such are only suited for soft contact lenses.

A stiff silicone containing hard lens is described in U.S. Pat. No. 4,152,508 and it consists of a copolymer of a oligosiloxanyl-alkyl acrylate with various comonomers, such as dimethyl itaconate and methyl methacrylate. Although oxygen permeabilities of $3-50\times10^{-10}$ $(cm^3STP).cm)/cm^2sec.cm.Hg$ are claimed, the high amounts of oligosiloxane substituted methacrylate (>40%) necessary to get $O_2$-permeabilities higher than 9 make the polymer at the same time too soft to be useful as a hard lens. Only if the Si-monomer constitutes less than 25% of the polymer is polymer hardness sufficiently high for hard contact lens application. Since the siloxane content also affects the wettability adversely, it is, of course, advantageous having to use as little Si in the polymer as possible, just enough to achieve the necessary $O_2$-permeability.

Siloxane urethane acrylate compounds which are useful in the preparation of coating compositions for radiation curing are described in U.S. Pat. No. 4,130,708. These siloxane urethane acrylate compounds may be mixed with other ingredients normally found in coating compositions and radiation cured with UV light. The use of such materials for contact lenses is neither described nor suggested by this patent. The coating compositions described in this patent do not include any hydrophilic monomer components.

British Pat. No. 2,067,213 also describes siloxane urethane acrylate compounds useful in the preparation of photocurable coating compositions. The use of such materials for contact lenses is not disclosed. The coating compositions described in this patent do not include any hydrophilic monomer components nor the hydrophobic comonomers described in this invention.

It is known that $SiO(CH_3)_2$ is a more efficient oxygen-transmitter if it is present in form of siloxane polymer than if it is only part of a low molecular weight side group. However, the long polysiloxane chains which are present in compositions of U.S. Pat. No. 4,153,641 and related patents drastically reduce stiffness, leading to rubbery and soft materials. In addition, their compatability with such unrelated polymers as polymethacrylates is poor and phase separation, typical for blends of high-molecular weight polymers, leads to more or less opaque products.

It has now been discovered unexpectedly that if polyfunctional high molecular weight polysiloxanes whose equivalent weight is not greater than 5000 and which are connected to at least two terminal or pendant polymerizable vinyl groups through bis-urethane linkages are incorporated into a crosslinked vinyl copolymer, hard, stiff and clear products are obtained which have excellent $O_2$-permeability, up to four times higher than the best prior-art composition, and which are even at a siloxane content of >50% stiff enough to fulfill the requirements of a hard contact lens. It has further, very unexpectedly, been found that the siloxane containing polymers of this invention can be made with better wettability than conventional PMMA hard lenses, despite their high polysiloxane content.

It is contemplated that the unexpected hardness and clarity characteristics of the polymers of this invention are a result of two features: first, in case of a comb-like structure of a high MW polysiloxane, the actual linear chain length of $-\!\![SiO(CH_3)_2]\!\!-$ between crosslinks is relatively short, despite an overall high molecular weight. This short effective chain length between crosslinks restricts mobility of the polysiloxane chains and minimizes phase separation; at the same time the overall high molecular weight and long continuous strands of $-\!\![SiO(CH_3)_2]\!\!-$ units and pendant groups insure good oxygen permeability. Secondly, the presence of at least four urethane or urea linkages per mole of polysiloxane contributes through hydrogen-bonding rigidity to the polymer.

The preferred polysiloxane macrometers for synthesis of hard contact-lens materials are ones which contain (a) at least one urethane linkage group per twelve $-\!\![SiO(CH_3)_2]\!\!-$ units; (b) which contain at least two polymerizable vinyl groups attached pendant to the polysiloxane backbone and therefore contain at least two terminal $-\!\![Si(CH_3)_3]$ units; and (c) contain urethane groups derived from bulky, cycloaliphatic diisocyanates. The preferred comonomers to be combined with the polysiloxane macromers are acrylates and methacrylates which when polymerized by themselves give hard homopolymers with a high glass-transition temperature, such as methyl methacrylate, isopropyl-, isobutyl-, tert.butyl-, cyclohexyl- or isobornyl methacrylate.

Although this invention is primarily directed toward hard contact-lens materials, it was found that clear, strong, but rubbery polymers can also be made. Such polymers, which are useful in a variety of applications like as biocompatible implants, bandages for wound treatment or as soft contact lenses, are thus another embodiment of this invention. It is thus within the scope of this invention to use comonomers which will result in strong, yet flexible and rubbery polymers.

DETAILED DESCRIPTION

The instant invention relates to a polymer, suitable for use in contact lenses, comprising the crosslinked copolymerization product of (A) from about 8 to about 70% by weight of said polymer of a linear or branched polysiloxane macromer having a molecular weight from about 400 to about 100,000, as measured by endgroup analysis or gel permeation chromatography, said macromer containing at least two terminal or pendant, polymerizable olefinic groups per each 5000 molecular weight unit of polysiloxane, said groups being attached to the polysiloxane through at least two urethane, thiourethane, urea or amide linkages, said macromer having the structure $A_1$ or $A_2$ (described in detail below), and (B) about 92 to about 30% by weight of said polymer of water-soluble and water-insoluble monomers or water-insoluble monomers, said monomers being monoolefinic, diolefinic or a mixture of monoolefinic and diolefinic monomers, with from 85 to 100% by weight of the total monomers being water-insoluble.

1. The Polysiloxane Macromer (A)

The linear or branched polysiloxane macromer of this invention is of one of the following general structures, $A_1$ or $A_2$:

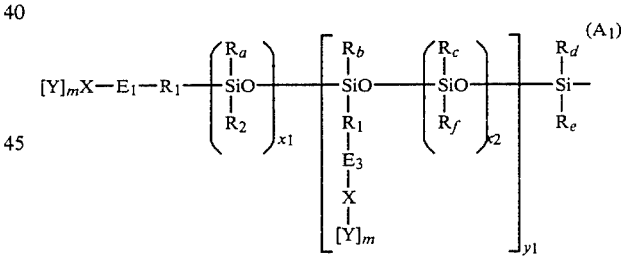

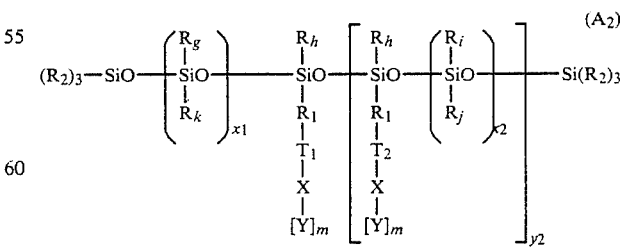

wherein:

$R_1$ is a linear or branched alkylene group with 2-6 carbon atoms or a polyoxyalkylene group of structure G $$+CH_2CHO]_nCH_2CH— \quad \text{(G)}$$
$$\quad\quad\quad | \quad\quad\quad\quad |$$
$$\quad\quad\quad R_3 \quad\quad\quad\quad R_3$$

wherein $R_3$ is hydrogen or methyl and n is an integer from 1-50, $R_2$, $R_a$, $R_b$, $R_c$, $R_d$, $R_e$, $R_f$, $R_g$, $R_h$, $R_i$, $R_j$ and $R_k$ are independently methyl or phenyl, $x_1$, $x_2$ are integers from 1 to 500 with the proviso that the sum of $x_1+x_2$ is 7 to 1000, $y_1$ is 0 to 14 and $y_2$ is 1 to 13 with the proviso that the ratio of $$\frac{x_1+x_2}{y_1+2} \text{ or } \frac{x_1+x_2}{y_2+1}$$

is not greater than 70, $E_1$, $E_2$ and $E_3$ independently of one another are a direct bond or a polycondensate chain containing saturated or unsaturated aliphatic or aromatic diradical residues of carboxylic diacids, carboxylic acid dianhydrides, carboxylic diacid chlorides, diamines, diols or diisocyanates and containing polysiloxane units derived by removing the residue $—E_1—X—[Y]_m$, $—E_2—X—[Y]_m$ or $—E_3—X—[Y]_m$ from the polysiloxane of structure $A_1$, and is connected to $R_1$ by an ester, amide, urethane, thiourethane or urea group, $T_1$ and $T_2$ independently of one another are a direct bond or are defined as for $E_1$, $E_2$ and $E_3$ except for containing polysiloxane units derived by removing the residue $—T_1—X—[Y]_m$ or $—T_2—X—[Y]_m$ from the siloxane of structure $A_2$, where at least one of $E_1$, $E_2$ and $E_3$ or $T_1$ and $T_2$ is not a direct bond, m is 1 or 2, X is a di- or tri-radical:

$$—Z_1—CO—NH—R_4—(NH—CO—)_v$$

wherein $v=1$ or 2, $Z_1$ is oxygen, sulfur or $NR_5$, wherein $R_5$ is hydrogen or lower ($C_1$-$C_4$) alkyl, $Z_1$ is connected to $R_1$; and $R_4$ is a di- or triradical obtained by removing the NCO-groups from an aliphatic, cycloaliphatic or aromatic di- or triisocyanate;

Y is:

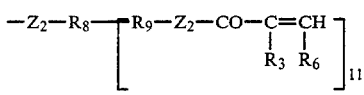  (I)

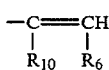  (II)

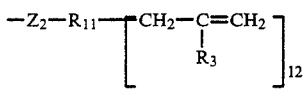  (III)

$$—O—R_7—O—CH_2=CH_2 \quad \text{(IV)}$$

wherein:

$R_6$ is: hydrogen, methyl, $—COOR_5$ or $—COOR_7OH$ with the proviso that if $R_6$ is other than hydrogen, m and $1_1=1$ and $R_8$ is a direct bond;

$Z_2$=oxygen or $—NR_5—$ $R_7$ is a linear or branched alkylene of 2 to 10 carbon atoms, phenylene or phenylalkylene with 2 to 10 carbon atoms in the alkylene, or polyoxyalkylene of structure G;

$R_8$ is $R_7$ or a tri- or tetra radical residue with 2-4 carbon atoms;

$1_1$ is 1 to 3;

$R_9$ is an alkylene group of from 2 to 4 carbon atoms or a direct bond with the proviso that if $1_1=1$, $R_9$ is a direct bond, and it follows that $R_8$ is a di-radical;

$R_{10}$ is hydrogen, methyl or $—CH_2COOH$, with the proviso that if $R_{10}$ is $—CH_2COOH$, $R_6$ is hydrogen;

$R_{11}$ is a direct bond or an aliphatic di- tri- or tetraradical with from 1-6 carbon atoms, and $1_2$ is 1 to 3, with the proviso that if $R_{11}$ is a direct bond, $1_2$ is 1 or 2.

The compounds of structures ($A_1$) and ($A_2$) are thus polysiloxanes connected by a diisocyanato linkage to vinyl groups which may be acrylic or methacrylic, fumaric, maleic or itaconic (Y structure I and II), allylic (III); or vinyl ether (IV) in nature.

Preferred embodiments of the instant invention have $R_1$=alkylene of 3 or 4 carbon atoms, $R_2$, $R_a$, $R_b$, $R_c$, $R_d$, $R_e$, $R_f$, $R_g$, $R_h$, $R_i$, $R_j$ and $R_k$=methyl, $x_1+x_2$=10 to 100, $y_1$=0 to 2, $y_2$=1 to 3, m=1, $X=—Z_1—CO—NH—R_4—NH—CO—$ $E_1$, $E_2$, $E_3$, $T_1$ and $T_2$ are each a direct bond or a polycondensate chain containing diradical residues of diisocyanates, containing polysiloxane units, and connected to $R_1$ by a urethane group and where at least one of $E_1$, $E_2$, $E_3$ or $T_1$ and $T_2$ is not a direct bond, where $Z_1$=oxygen or $—NH—$, $R_4$=diradical of aliphatic or cycloaliphatic diisocyanate with 6 to 10 carbon atoms Y=of structure I, wherein $R_6$=hydrogen, $R_8=—CH_2CH_2—$; $R_9$ is a direct bond and $1_1=1$; and $Z_2$=oxygen or

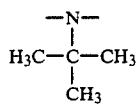

Most preferred embodiments include the

Polysiloxane of structure: ($A_2$), $R_4$=diradical of isophorone diisocyanate, $Z_1$, $Z_2$=oxygen, and $y_2$=1 or 2.

2. The Vinyl Monomer (B)

The water-insoluble vinyl monomers ($B_1$) useful in the present invention are:

Acrylates and methacrylates of the general structure:

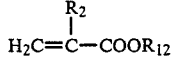

acrylamides and methacrylamides of structure:

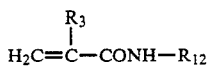

maleates and fumarates of structures:

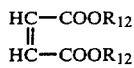

itaconates:

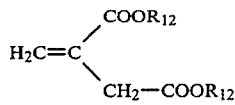

vinyl esters $$R_{12}-COO-CH=CH_2$$

vinyl ethers $$H_2C=CH-O-R_{12}$$

wherein:

$R_{12}$ is a linear or branched aliphatic, cycloaliphatic or aromatic alkyl group with from 1 to 21 carbon atoms and which may contain ether or thioether linkages or a —CO— group; $R_{12}$ may also be a heterocyclic alkyl group containing oxygen, sulfur or nitrogen atoms, or a polypropylene oxide or poly-n-butylene oxide group with from 2 to 50 repeating alkoxy units.

In addition, the $R_{12}$ group may contain halogen atoms, especially fluorine in form of perfuorinated alkyl groups with from 1-12 carbon atoms; or it may contain siloxane groups with from one to six Si atoms; and may contain —SO— and —SO$_2$— groups.

Included among the useful monomers are: methyl-; ethyl-; propyl-; isopropyl-; butyl-; isobutyl-; tert.-butyl-; ethoxyethyl-; methoxyethyl-; benzyl-; phenyl-; cyclohexyl-; trimethylcyclohexyl-; isobornyl-; dicyclopentadienyl-; norbornylmethyl-; cyclododecyl-; 1,1,3,3-tetramethylbutyl-; n-butyl-; n-octyl-; 2-ethylhexyl-; decyl-; dodecyl-; tridecyl-; octadecyl-; glycidyl-; ethylthioethyl-; furfuryl-; hexafluoroisopropyl-; 1,1,2,2-tetrahydroperfluorododecyl-; tri-, tetra- or penta-siloxanyl propyl-acrylates and methacrylates, as well as the corresponding amides; N-(1,1-dimethyl-3-oxobutyl)acrylamide; mono- and dimethyl fumarate, maleate and itaconate; diethyl fumarate; isopropyl and diisopropyl fumarate and itaconate; mono- and diphenyl and methyl phenyl fumarate and itaconate; methyl vinyl ether and methoxyethyl vinyl ether; vinyl acetate, vinyl propionate, vinyl benzoate, acrylonitrile, styrene and alpha-methyl styrene.

In order to achieve the high clarity necessary for contact-lens applications, it is especially useful to use comonomers or comonomer mixtures whose corresponding polymers closely match in solubility parameter ($\delta$) and/or refractive index (RI) the values of polydimethylsiloxane ($\delta=15$; RI$=1.43$). Such monomers are, for example, isobornyl methacrylate, tert.-butyl methacrylate and mixtures of hydrocarbonmethacrylates (RI 1.46) with fluorine containing monomers, like hexafluoroisopropyl methacrylate; trifluoroethyl methacrylate; 1,1,2,2-tetrahydroperfluoroalkyl methacrylate or 4-thia-6-perfluoroalkyl-hexyl methacrylate, where alkyl is a carbon chain of 5-12 C atoms (RI's of 1.38-1.40) ($\delta<15$). In addition, perfluoroalkyl groups containing monomers greatly enhance the oxygen permeability of the polymers in a synergistic manner with the polysiloxane; as such they are accordingly especially preferred comonomers.

For making hard lenses, the preferred comonomer content is 50-85% by weight of the total polymer with the preferred comonomer being methyl methacrylate, cyclohexyl metacrylate, isobornyl methacrylate, isopropyl methacrylate, isobutyl methacrylate, tert-butyl methacrylate or hexafluoroisopropyl methacrylate or mixtures thereof.

Most preferably the comonomer is methyl methacrylate, isobornyl methacrylate, isopropyl methacrylate, isobutyl methacrylate or cyclohexyl methacrylate, or mixtures thereof. Also most preferred are mixtures of methyl methacrylate and/or isobornyl methacrylate with 1 to 25% by weight of the total monomer of a short chain crosslinking agent neopentylene glycol diacrylate, ethylene glycol dimethacrylate or the reaction product of one mol of isophorone diisocyanate and two moles of 2-hydroxyethyl methacrylate.

Another most preferred comonomer system for preparing hard lenses is vinyl acetate/dimethyl maleate (2/1 to 5/1 molar ratios) plus a preferred methacrylate monomer listed above.

For making soft lenses, the preferred comonomer is 2-ethylhexyl acrylate, 2-ethylhexyl methacrylate, n-butyl acrylate, n-butyl methacrylate, n-octyl acrylate, n-octyl methacrylate, n-decyl acrylate n-decyl methacrylate, perfluoroalkyl (C$_6$-C$_{10}$) substituted alkyl acrylate or methacrylate, or mixtures thereof.

The contact lenses made from the polymers of this invention are fillerless, hydrolytically stable, biologically inert, transparent and sufficiently permeable to oxygen to allow the transport of oxygen sufficient to meet the requirements of the human cornea.

The water soluble vinyl monomer (B$_2$) which are useful in the present invention are: acrylates and methacrylates of the general structure:

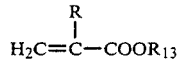

$R_{13}$ is a hydrocarbon residue of 1 to 10 carbon atoms substituted by one or more water solubilizing groups such as carboxy, hydroxy or tert.-amino, or a polyethylene oxide group with from 2-100 repeating units, or a group which contains sulfate, phosphate, sulfonate or phosphonate groups.

Acrylamides and methacrylamides of structure

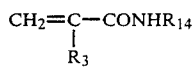

wherein $R_{14}$ is $R_{13}$ or $R_5$;

Acrylamides and methacrylamides of structure

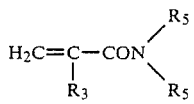

Maleates and fumarates of structure:

Vinyl ethers of structure:

N-vinyl-lactams, like N-vinyl-2-pyrrolidone,

Included among the useful water soluble monomers are:

2-hydroxyethyl-; 2- and 3-hydroxypropyl-, 2,3-dihydroxypropyl-; polyethoxyethyl-; and polyethoxypropyl-acrylates and methacrylates as well as the corresponding acrylamides and methacrylamides. Sucrose-, mannose-, glucose-, sorbitolacrylates and methacrylates.

Acrylamide and methacrylamide; N-methylacrylamide and methacrylamide, bisacetone-acrylamide; 2-hydroxyethyl acrylamide; dimethyl-acrylamide and methacrylamide; methylolacrylamide and methacrylamide.

N,N-dimethyl- and N,N-diethyl-aminoethyl acrylate and methacrylate as well as the corresponding acrylamides and methacrylamides; N-tert.butylaminoethyl methacrylate and methacrylamide; 2- and 4-vinylpyridine; 4- and 2-methyl-5-vinylpyridine; N-methyl-4-vinyl piperidine; 1-vinyl- and 2-methyl-1-vinyl-imidazole; dimethylallylamine and methyldiallylamine. Para- and orthoaminostyrene; dimethylaminoethyl vinyl ether; N-vinylpyrrolidone; 2-pyrrolidinoethyl methacrylate.

Acrylic and methacrylic acid; Itaconic; cinnamic-, crotonic-, fumaric-, maleic acids and lower hydroxyalkyl mono- and diesters thereof, such as 2-hydroxyethyl- and di(2-hydroxy)ethyl fumarate,- maleate and itaconate, and 3-hydroxypropyl-butyl fumarate, and di-polyalkoxyalkyl-fumarates, maleates and itaconates.

Maleic-anhydride; sodium acrylate and methacrylate, 2-methacryloyloxyethylsulfonic acid, 2-acrylamido-2-methylpropanesulfonic acid, 2-phosphatoethyl methacrylate, vinylsulfonic acid, sodium vinylsulfonate, p-styrenesulfonic acid, sodium p-styrenesulfonate, and allylsulfonic acid.

Also included are the quaternized derivatives of cationic monomers: obtained by quaternization with selected alkylating agents like halogenated hydrocarbons such as methyl iodide, benzyl chloride or hexadecyl chloride; epoxides like glycidol, epichlorohydrin, ethylene oxide; acrylic acid, dimethyl sulfate; methyl sulfate; propane sultone.

A more complete list of water soluble monomers useful in the content of this invention is contained in:
R. H. Yocum, E. B. Nyquist, Functional Monomers; Vol. 1, p. 424–440 (M. Dekker, N.Y. 1973).
Preferred monomers are:

($B_1$)=methyl methacrylate, cyclohexyl methacrylate, isobornyl methacrylate; t-butyl and isobutyl methacrylate, isopropylmethacrylate, hexafluoroisopropyl methacrylate.

($B_2$)=2-hydroxyethyl methacrylate; N,N-dimethylacrylamide; acrylic and methacrylic acid; N-vinyl-2-pyrrolidone;

A wide range of divinyl compounds can be used in addition to the monovinyl compounds. Indeed, from 1 to 25% by weight of the total monomer B can be a diolefinic monomer ($B_x$). Examples of diolefinic monomers are:

Allyl acrylate and methacrylate, ethylene glycol-, diethylene glycol-, triethylene glycol-, tetraethylene glycol-, and generally polyethylene oxide glycol diacrylates and dimethacrylates; 1,4-butane diol and poly-n-butylene oxide glycol diacrylates and dimethacrylates; propylene glycol and polypropylene oxide glycol diacrylates and dimethacrylates; thiodiethylene glycol diacrylate and dimethacrylate; di(2-hydroxyethyl)sulfone diacrylate and dimethacrylate; neopentylene glycol diacrylate and dimethacrylate; trimethylolpropane tri and tetraacrylate; pentaerythritol tri and tetraacrylate; divinylbenzene; divinyl ether; divinyl sulfone; disiloxanylbis-3-hydroxy propyl diacrylate or methacrylate and related compounds.

Bisphenol A diacrylate or dimethacrylate, ethoxylated bisphenol A diacrylate or dimethacrylate; methylene bisacrylamide or methacrylamide, dimethylene bisacrylamide or methacrylamide; N,N'-dihydroxyethylene bisacrylamide or methacrylamide; hexamethylene bisacrylamide or methacrylamide; decamethylene bisacrylamide or methacrylamide; allyl- and dialkyl maleate, triallyl melamine, diallyl itaconate, diallyl phthalate, triallyl phosphite, polyallyl sucrose, sucrose diacrylate, glucose dimethacrylate; also, unsaturated polyesters, such as poly-(alkylene glycol maleates) and poly(alkylene-glycol fumarates), like poly(propylene glycol maleate) and poly(polyalkyleneoxide glycol maleate).

Also useful as crosslinking agents are the reaction products obtained by reacting 1 mol of di- or tri-isocyanate of structure $OCN-R_4-(NCO)_{1,2}$ wherein $R_4$ is as described below with 2 or 3 moles of a hydroxyalkyl acrylate or methacrylate, or a hydroxyalkyl vinyl ether or allyl alcohol, or N-tert.-butylaminoethyl methacrylate, or bis-hydroxyethyl maleate or any of the active-hydrogen containing compounds listed below.

Preferably the diolefinic monomer ($B_x$) is the acrylate or methacrylate of allyl alcohol, of a straight or branched chain alkylene glycol of 2 to 6 carbon atoms, of poly(ethylene oxide)glycol, of poly(propylene oxide) glycol, of poly(n-butylene oxide) glycol, of thiodiethylene glycol, of neopentylene glycol, of trimethylolpropane, or of pentaerthyritol; or the reaction product obtained by reacting one mol of a di- or tri-isocyanate of structure $OCN-R_4-(NCO)_v$, where $R_4$ is defined as above and v is 1 or 2, with 2 or 3 moles of a hydroxyalkyl acrylate or methacrylate.

A most preferred difunctional comonomer ($B_x$) is 1 to 25% by weight of the total monomer or neopentylene glycol diacrylate, the reaction-product of 1 mol isophorone diisocyanate and 2 moles of 2-hydroxyethyl methacrylate, or ethylene glycol dimethacrylate.

The monomers can be used alone, or in combination with each other with the necessary attention given to their copolymerization parameters to make sure that random copolymerization takes place. In addition, if the polymers are to be used for contact lenses, a high degree of clarity and lack of color are essential for choosing an appropriate monomer combination.

A preferred embodiment of the instant invention is a polymer where component A is a polysiloxane of structure $A_1$ or $A_2$, $R_1$ is alkylene of 3 or 4 carbon atoms, $R_2$, $R_a$, $R_b$, $B_c$, $R_d$, $R_e$, $R_f$, $R_g$, $R_h$, $R_i$, $R_j$ and $R_k$ are each methyl, $x_1$, $+x_2$ is 10 to 100, $y_1$ is 0 to 2, $y_2$ is 1 to 3, m is 1, $E_1$, $E_2$, $E_3$, $T_1$ and $T_2$ are each a direct bond or a polycondensate chain containing diradical residues of diisocyanates, containing polysiloxane units, and connected to $R_1$ by a urethane group, and where at least one of $E_1$, $E_2$ and $E_3$ or $T_1$ and $T_2$ is not a direct bond, X is $-Z_1-CONH-R_4-NHCO-$ where $Z_1$ is $-O-$ or $-NH-$ and $R_4$ is a diradical of an aliphatic or cycloaliphatic diisocyanate with 6 to 10 carbon atoms, and Y is

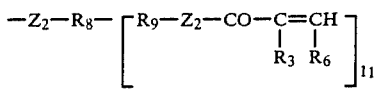

wherein $R_6$ is hydrogen, $R_8$ is ethylene, $R_9$ is a direct bond, $l_1$ is 1 and $Z_2$ is —O— or —NC(CH$_3$)$_3$—, and component B contains from 1 to 25% based on total monomer of a diolefinic monomer ($B_x$) which is the acrylate or methacrylate of allyl alcohol, of a straight or branched chain alkylene glycol of 2 to 6 carbon atoms, of poly(ethylene oxide) glycol, of poly(propylene oxide) glycol, of poly(n-butylene oxide) glycol, of thiodiethylene glycol, of neopentylene glycol, of trimethylolpropane, or of pentaerythritol; or the reaction product obtained by reacting one mol of a di- or tri-isocyanate of structure OCN-$R_4$-(NCO)$_v$, where $R_4$ is defined as above and v is 1 or 2, with 2 or 3 moles of a hydroxyalkyl acrylate or methacrylate.

Poly-functional Polysiloxanes, useful as starting materials for the macromer (A), are of structures:

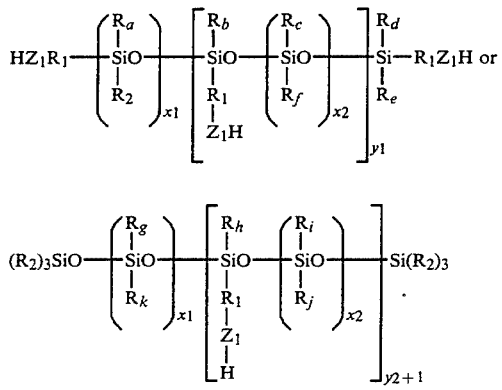

wherein:
$R_1$, $R_2$, $R_a$, $R_b$, $R_c$, $R_d$, $R_e$, $R_f$, $R_g$, $R_h$, $R_i$, $R_j$, $R_k$, $Z_1$, $x_1$, $x_2$, $y_1$ and $y_2$ are as described above.

Di- or triisocyanates useful to form the prepolymer intermediate are aliphatic, cycloaliphatic or aromatic polyisocyanates of structures:

OCN—$R_4$(NCO)$_1$ or $_2$, and include: ethylene diisocyanate, 1,2-diisocyanatopropane, 1,3-diisocyanatopropane. 1,6-diisocyanatohexane, 1,2-diisocyanatocyclohexane, 1,3-diisocyanatocyclohexane, 1,4-diisocyanatocyclohexane, o-diisocyanatobenzene, m-diisocyantobenzene, p-diisocyanatobenzene, bis(4-isocyanatocyclohexyl)methane, bis(4-isocyanatocyclohexanyl)methane, bis(4-isocyanatophenyl)methane, toluene diisocyanate, 3,3-dichloro-4,4'-diisocyanatobiphenyl, tris(4-isocyanatophenyl)methane, 1,5-diisocyanatonaphthalene, hydrogenated toluene diisocyanate, 1-isocyanatomethyl-5-isocyanato-1,3,3-trimethylcyclohexane (=isophorone diisocyanate), 1,3,5-tris(6-isocyanotohexyl)biuret, 1,6-diisocyanato-2,2,4-(2,4,4)-trismethylhexane, 2,2'-diisocyanatodiethyl fumarate, 1,5-diisocyanato-1-carboxypentane; 1,2-, 1,3-, 1,5-, 1,6-, 1,7-, 1,8-, 2,7- and 2,3-diisocyanatonaphthalene; 2,4- and 2,7-diisocyanato-1-methylnaphthalene; 1,4-diisocyanto-methylcyclohexane; 1,3-diisocyanato-6(7)-methylnaphthalene; 4,4'-diisocyanatobiphenyl; 4,4'-diisocyanato-3,3'-dimethoxy-bisphenyl; 3,3'- and 4,4'-diisocyanato-2,2'-dimethyl biphenyl; Bis-(4-isocyanatophenyl)ethane; bis(4-isocyanatophenyl) ether.

The diisocyanates can be used alone or in combination with each other.

Active hydrogen containing monomers useful to endcap the polysiloxane polyisocyanate include compounds of structure:

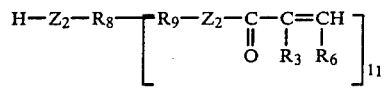

wherein $R_3$, $R_6$, $R_8$, $R_9$ and $Z_2$ described as above and which thus are active hydrogen containing acrylates, methacrylates, as well as di- and tri acrylates and methacrylates; fumarates, maleates and the corresponding amides, such as:

2-hydroxyethyl-; 2- and 3-hydroxypropyl-; 2,3-dihydroxypropyl-; polyethoxyethyl-; polyethoxypropyl-; polypropoxy-propyl-acrylates and methacrylates as well as the corresponding acrylyl- and methacrylamides; 2-hydroxyethyl and bis(2-hydroxyethyl) fumarate, and itaconate; hydroxypropylbutyl fumarate; N-(2-hydroxyethyl)maleimide and N-(2-hydroxyethylethyl)maleimide; tert.-butylaminoethyl methacrylate, pentaerythritol mono-, di-, and triacrylate;

Other useful classes of compounds are allylic monomers like allyl alcohol and methallyl alcohol and diallylamine; and vinyl ethers of the structure:

$$H_2C=CH-O-R_7-OH$$

where $R_7$ is as described above, for instance 4-hydroxybutyl vinyl ether.

A list of useful monomers in the context of this invention is contained in R. H. Yocum, E. B. Nyquist; Functional Monomers, Vol. 1, p. 424–440 (M. Dekker, N.Y. 1973).

The polysiloxane-polyisocyanate prepolymer can also be capped by unsaturated acids, using a base or metal catalyst and resulting in an amide linkage with evolution of $CO_2$. Useful acids include: acrylic acid, methacrylic acid, fumaric acid, maleic acid, itaconic acid, cinnamic acid.

The monomers $B_1$ and $B_2$, the diisocyanates and the poly-functional polysiloxane starting materials for A are largely items of commerce.

SYNTHESIS

The polysiloxane macromers are obtained conveniently by a 2-step synthesis from the corresponding polyfunctional polysiloxanes. There are in the most preferred case diols or polyols, but they can also be amino-functional or mercaptofunctional polysiloxanes. As a first step, the polysiloxane is reacted, either in bulk or in solution, with a given amount of a di- or triisocyanate in the presence of any of the conventional catalysts. These catalyst may be tertiary amino groups containing compounds such as triethylamine, pyridine or diaminobicyclooctane, or metal based catalyst like dibutyltin dilaurate or stannous octoate. The reaction is carried out at either ambient or elevated temperatures under a dry nitrogen blanket and can be followed conveniently by NCO-titration or IR analysis. In case of diisocyanate, the % NCO decreases to a calculated percent of the original value and the first step reaction product consists of a polysiloxane diisocyanate. The molar ratio of OH to NCO groups during the first reaction step can be 1:1.5 to 1:3 and is preferably in the range of 1:2.05–1:2.1.

The second step of the reaction consists of end-capping this poly-isocyanate with a hydroxy or amino functional vinyl compound, most commonly with 2-hydroxyethyl methacrylate. It is advisable to use at least a small excess of the end-capping monomer, typically a mol. ratio of OH, SH, NH/NCO of 1.05/1 or larger. Since it is a preferred practice to incorporate small amount of a water soluble monomer into the final polymer in order to achieve good wetting characteristics, a greater excess of the hydroxy or amino functional monomer is not detrimental. The reaction proceeds at ambient or elevated temperatures over a period of several hours with no additional catalyst necessary. Since normally no inhibitors are present, an oxygen-free, nitrogen-blanket is essential. The end of the reaction is easily determined by IR spectroscopy by monitoring for —NCO groups.

Sometimes it is practical, for instance in cases of very highly viscous materials, to carry out the second step of the macromer synthesis in a monomer solution which corresponds to the final desired polymer composition.

Although it is preferable to react one equivalent reactive polysiloxane with close to two equivalents diisocyanate and thereby obtain an isocyanate-endcapped polysiloxane, due to the laws of polycondensation kinetics a certain amount of chain extended product, in which the endcapped polymer contains two polysiloxane chains connected by a diisocyanate unit, is always obtained and can be analyzed, for instance by gel permeation chromatography.

It is therefore within the scope of the present invention to use as polysiloxanes prepolymers obtained from polysiloxanes of structures $A_1$ and $A_2$ (y=2) by chain-extension reactions commonly used by those skilled in the art of polycondensation, especially polyurethane, chemistry. Such chain extensions can be achieved for instance by polycondensation of the aforementioned polysiloxane diols, dithiols or diamines with: diacid chlorides or anhydrides of dianhydrides, such as terephthaloyl chloride, adipic acid dichloride, maleic anhydride, phthalic anhydride or benzophenone-tetracarboxylic acid and dianhydride; with diisocyanates of the structures mentioned above, in which case the synthesis step for preparing the NCO-capped macromer as described is simply carried out with less than a 2:1 excess of NCO over —OH; —SH or —NH$_2$ groups; likewise the NCO-terminated prepolymers obtained before the final capping step is carried out with the hydroxy-vinyl compounds, can be chain extended with diols or diamines according to the known techniques of polyurethane technology, with, for example, ethylene glycol, propylene glycol, butanediol, hexanediol, polyetherdiols containing ethylene oxide, propylene oxide or n-butylene oxide repeating units; polyester diols; ethylenediamine, hexanediamine and diprimary or di-secondary amines in general, including diamines derived from polyalkylene oxides. To the extent that through these chain extension reactions additional amide, urethane or urea groups are introduced into the structure, they contribute by hydrogen-bonding to the rigidity and clarity of the polymer. Chain extensions of the sort just described however do dilute the overall polysiloxane content of the prepolymer and therefore a larger amount of such a prepolymer is necessary to maintain a high oxygen permeability in the final polymer.

The transparent, hard and oxygen permeable polymers of this invention are produced in a final synthesis step by free radical copolymerization, either in bulk or in the presence of small amounts of solvents. The polymerization is suitably carried out with a free radical generating initiator at a temperature in the range from about 40° C. to about 105° C., the preferred temperature ranges being between about 50° C. and about 100° C. These initiators are preferably peroxides or azo catalysts having a half-life at the polymerization temperature of at least 20 minutes. Typical useful peroxy compounds include: isopropyl percarbonate, tert-butyl peroctoate, benzoyl peroxide, lauroyl peroxide, decanoyl peroxide, acetyl peroxide, succinic acid peroxide, methyl ethyl ketone peroxide, tert.-butyl peroxyacetate, propionyl peroxide, 2,4-dichlorobenzoyl peroxide, tert.-butyl peroxypivalate, pelargonyl peroxide, 2,5-dimethyl-2,5-bis(2-ethylhexanoylperoxy)hexane, p-chlorobenzoyl peroxide, tert.-butyl peroxybutyrate, tert.-butyl peroxymaleic acid, tert.-butyl-peroxyisopropyl carbonate, bis(1-hydroxycyclohexyl)peroxide; azo compounds include: 2,2-azo-bis-isobutyronitrile; 2,2'-azo-bis(2,4-dimethylvaleronitrile); 1,1'-azo-bis (cyclohexane carbonitrile), 2,2'-azo-bis(2,4-dimethyl-4-methoxyvaleronitrile).

Other free radical generating mechanisms can be employed, such as X-rays, electron-beams and UV-radiation. Preparation of contact-lens blanks by UV radiation in the presence of a photo-initiator such as diethoxyacetophenone, 1-hydroxycyclohexyl phenylketone, 2,2-dimethoxy-2-phenylacetophenone, phenothiazine, diisopropylxanthogendisulfide, benzoin and benzoin derivatives is a preferred method.

The amount of initiator can vary from 0.002% to 1% by weight of the monomer and macromer, but is preferably from 0.03 to 0.3% by weight thereof.

A preferred laboratory method of preparing the polymer, in the form of a cylinder, comprises the filling of flexible polymer tubing with the preferred composition of macromer, monomers, and catalyst and reacting the mixture for approximately 2 hours at 80° C. The finished article is removed by slitting the tubing longitudinally and stripping it away from the polymer article.

Another preferred method for preparing the polymer is by irridiation with ultraviolet light in the presence of a photo-initiator and using plastic molds which are UV transparent, such as molds made of polypropylene.

The reaction is preferably carried out in an inert atmosphere if done in open molds. It is known that oxygen inhibits polymerization and gives rise to extended polymerization times. If closed molds are used to form the article, the molds are composed of inert materials having low oxygen permeability and non-stick properties. Examples of suitable molding materials are poly(tetrafluoroethylene), such as Teflon ®, silicone rubber, polyethylene, polypropylene and polyester, such Mylar ®. Glass and metallic molds may be used if a suitable mold-releasing agent is employed.

The transparent and oxygen permeable polymers of this invention consist of 8–70% of the macromer (A), copolymerized with 30–92% of the vinyl comonomer component (B).

Preferably, the polymers consist of 15–60% to macromer (A) and 85–40% vinyl compounds (B).

The polymers of this invention can be tailored so as to be useful either as hard contact lens material or as soft contact lens material. Different comonomers and different levels of polysiloxane macromer are required to get optimal performance in either contact lens type.

In choosing the polysiloxane component and the vinyl monomer for a hard contact lens composition, it is of course important to arrive at a mixture which will give clear polymers with sufficient dimensional stability and oxygen-permeability. Sometimes a mixture of co-monomers is advantageous in avoiding phase-separation and thereby opacity. Also, it is easier to obtain clear products with polysiloxanes of relatively low molecular weight than with high molecular weight polysiloxanes. Polysiloxanes with a short chain length between cross-links also give harder, more dimensionally stable polymers; however, their oxygen permeability is reduced compared to polysiloxanes with longer chain length and therefore lower crosslink density. By a judicious choice of monomer(s) and polysiloxane macromer, one is thus able to tailor to a considerable degree the physical properties and oxygen permeability of the instant silicone polymers.

For preparing hard contact lenses, the preferred polymer comprises the crosslinked copolymerization product of (A) from about 15 to about 35% by weight of a polysiloxane macromer, and (B) from about 85 to about 65% by weight of a mixture of water-insoluble monomers ($B_1$), of water-soluble monomers ($B_2$) and of a diolefinic monomer ($B_x$), wherein, based on % by weight of the total weight of monomers, $B_1$ is from about 60 to about 95%, $B_2$ is from about 15 to about 0%, and $B_x$ is from about 25 to about 5%. The preferred water-insoluble monomers $B_1$ are methyl methacrylate, isopropyl methacrylate, isobutyl methacrylate, tert-butyl methacrylate, cyclohexyl methacrylate, isobornyl methacrylate or mixtures thereof. The preferred water-soluble monomers $B_2$ are 2-hydroxyethyl methacrylate, N,N-dimethylacrylamide, acrylic acid, methacrylic acid or N-vinyl-2-pyrrolidone or mixtures thereof. The preferred diolefinic monomer $B_x$ is neopentylene glycol diacrylate, ethylene glycol dimethacrylate or the reaction product of one mol of isophorone diisocyanate and two moles of 2-hydoxyethyl methacrylate.

For preparing soft contact lenses, the preferred polymer comprises the crosslinked copolymerization product of (A) from about 40 to about 60% by weight of a polysiloxane macromer, and (B) from about 60 to about 40% by weight of a mixture of water-insoluble monomer ($B_1$), of water-soluble monomer ($B_2$) and of a diolefinic monomer ($B_x$), wherein based on % by weight of the total weight of monomers, $B_1$ is from about 75 to about 100%, $B_2$ is from about 25 to about 0%, and $B_x$ is from about 5 to about 0%. The preferred water-insoluble monomers ($B_1$) are ethyl acrylate or methacrylate, n-butyl acrylate or methacrylate, n-hexyl acrylate or methacrylate, 2-ethylhexyl acrylate or methacrylate, n-octyl acrylate or methacrylate, n-decyl acrylate or methacrylate; or mixtures thereof or with mixtures thereof with methyl or isobornyl methacrylate. The preferred water-soluble monomers ($B_2$) and diolefinic monomers ($B_x$) are those listed above for preparing hard contact lenses.

An example of a preferred polymer for making a hard contact lens comprises (A) 30% by weight of the polysiloxane of structure $A_2$ where $R_4$ is a diradical derived from isophorone diisocyanate, $Z_1$ and $Z_2$ are each —O—, and $y_2$ is 2, and 70% by weight of monomer (B) wherein, based on % by weight of total monomers, $B_1$ is 71.4% of methyl methacrylate, $B_2$ is 5.7% of 2-hydroxyethyl methacrylate and $B_x$ is 22.9% of neopentylene glycol diacrylate.

An example of a preferred polymer for making a soft contact lens comprises (A) 50% by weight of the polysiloxane of structure $A_2$ where $R_4$ is a diradical derived from isophorone diisocyanate, $Z_1$ and $Z_2$ are each —O—, and $y_2$ is 2, and 50% by weight of monomers (B) wherein $B_1$ is 80% of a 50/50 mixture of methyl methacrylate/2-ethylhexyl acrylate and $B_2$ is 20% of 2-hydroxyethyl methacrylate.

Although this invention is directed primarily toward the manufacture of hard, dimensionally stable contact lenses, it is within the scope of this invention to use any of the aforementioned monomers to make strong, $O_2$-permeable polymers with a wide range of physical properties, from hard and rigid to rubbery and soft. Such soft polymers are, for instance, useful as bandages, or as soft contact lenses, especially when they are treated by any of the commonly used methods used to increase the wettability of hydrophobic surfaces, such as plasma-treatment and irradiation-grafting and oxidation.

Because of their good tissue compatibility and oxygen permeability and strength and elasticity, the polymers of the present invention are particularly suitable for use as intra-muscular and subcutaneous implants in warm-blooded animals and as contact lens material. For the same reasons, the materials of the present invention may be fashioned into substituted blood vessels or extra-corporeal shunts.

The following examples are presented for the purpose of illustration only and are not to be construed to limit the nature and scope of the instant invention in any manner whatsoever.

The following examples, specific oxygen permeability ($O_2.DK$) is determined by measuring dissolved oxygen permeability at 35° C. with a polarographic electrode in an air-saturated aqueous environment and is expressed in units $$O_2DK = \frac{cm^3(STP) x \cdot cm}{cm^2 \times sec \times cmHg} \times 10^{10}$$

Wettability is determined by measuring the contact angle of an n-octane droplet which had risen to the lower surface of a 1 mm thick sample sheet immersed in octane saturated distilled water at 36° C. In this measurement high numbers signify high wettability.

Hardness is determined using a Shore-D durometer on polished surfaces of center cut buttons of 10 mm diameter and 8 mm height.

As reference materials for $O_2$-DK measurements, water swollen poly(2-hydroxyethyl methacrylate) (poly-hema; 39% water content; the most common soft-lens material) and CAB, cellulose-acetate-butyrate (an oxygen-permeable hard-lens material) are used; for wettability and hardness poly-hema and poly(methyl methacrylate) are used as reference materials. The $O_2.DK$, Shore-D and contact angle values for these materials are given below.

| Reference Materials | $O_2$.DK | Shore-D | Octane/Water Contact Angle |
|---|---|---|---|
| poly-hema (39% $H_2O$) | 12 | — | 151 |
| poly(methyl methacrylate) | very low | 92 | 92 |
| cellulose-acetate-butyrate | 8.2 | 80 | 161 |

The following examples demonstrate the synthesis of the vinyl-capped polysiloxane macromer.

EXAMPLE 1

Preparation of Poly-siloxane Macromer

A 1-liter 3-necked flask fitted with a mechanical stirrer, thermometer, condenser and nitrogen inlet is charged with 186.6 g (0.03 moles) of polydimethylsiloxane-triol (DOW CORNING, fluid 1248), which had been stripped free of volatiles by passing it through a wiped-film evaporator. Then 21.0 g (0.0945 moles) 1-isocyanatomethyl-5-isocyanato-1,3,3-trimethylcyclohexane (isophorone diisocyanate, IPDI) are added together with 0.025 g dibutyltin dilaurate as catalyst. The mixture is then stirred under nitrogen on a temperature controlled water bath at 50° C. for five hours. At that time the NCO content as determined by titration has fallen to 1.94% (2.00% theoretical).

Then 169.4 g of the polydimethylsiloxane triisocyanate prepolymer prepared above are diluted with 10.2 g 2-hydroxyethyl methacrylate (HEMA) and stirred under nitrogen at room temperature until all NCO groups have been reacted as determined by the absence of the isocyanate band from the infrared spectrum. The resulting product consists of >99.9% methacrylate terminated polysiloxane and a minor amount of HEMA-capped IPDI indicating that some chain extension had taken place. This is also confirmed by gel permeation chromatography.

EXAMPLES 2-17

Preparation of Polymer Samples 30 g each of the polysiloxane macromer prepared according to Example 1 are mixed with comonomers in the ratios shown in Table 1. 0.06 g (0.2%) 1-hydroxycyclohexyl phenyl ketone, IRGACURE-184, (a UV-initiator of CIBA-GEIGY) is added and each mixture is thoroughly degassed and then stored under nitrogen. One portion of each mixture is used to prepare 0.1 mm thick films between silane-treated glass plates; 0.1 mm thick MYLAR (polyester film of DuPont) is used as a spacer and the mold is held together by clamps. The molds are exposed to UV light from a Black Light Blue (SYLVANIA) lamp for 3 hours, after which time the polymer is removed from the mold to be used for oxygen permeability measurements.

In the same manner a 1 mm thick sheet is cast from each monomer-macromer mixture and used for determination of wettability.

Yet another part of each monomer-macromer mixture is filed with a fixed-volume syringe into cylindrical polypropylene molds of 14 mm diameter and 8 mm height and sealed by a loose fitting, convex-polypropylene cover. The molds are inserted in a tray and irradiated in a nitrogen sparged box, using the lamps described above, first from below only until the mixture is gelled (15 minutes) then from the top and below for three hours total. Then the molds are opened and the polymer button removed. Several buttons are cut in half, both parallel and normal to the round surface and the cut surfaces are polished to measure hardness.

Values in the following table show the effect of selected comonomers on $O_2.DK$, wetting and hardness. These polymers have Young's Modulus values of >1(GPa).

TABLE 1

Synthesis and Properties of Polymers Containing 4% HEMA, and 66% Various Comonomers and 30% Polysiloxane Macromer of Example 1
(all % values are by weight)

| Ex. No. | Polymer Contains 66% of the Following Comonomers | Appearance | Water Content $O_2.DK$ | Octane Young Mod. Angle,° | Shore-D (GPa) | Hardness |
|---|---|---|---|---|---|---|
| 2 | Methyl Methacrylate | clear | 24.3 | 95 | 2.0 | 78 |
| 3 | Cyclohexyl Methacrylate | clear | 31.0 | 120 | 1.5 | 79 |
| 4 | Furfuryl Methacrylate | sl. opaque | 36.3 | 131 | — | 65 |
| 5 | Isobornyl Methacrylate | clear | 33.4 | 119 | 1.4 | 82 |
| 6 | Methoxystyrene | clear | 30.7 | 118 | — | 79 |
| 7 | Styrene | clear | 33.2 | 109 | 1.6 | 75 |
| 8 | Isobutyl Methacrylate | clear | 31.3 | 117 | 1.2 | 69 |
| 9 | Benzyl Methacrylate | clear | 52.4 | 110 | 1.0 | 71 |
| 10 | Methylene-bornenyl Methacrylate | clear | 29.1 | 144 | 1.3 | 79 |
| 11 | Dicyclopentenyl Methacrylate | clear | 33.8 | 123 | 1.6 | 79 |
| 12 | Dicyclopentenyl-oxy-ethyl Methacrylate | clear | 37.7 | 114 | 1.0 | 69 |
| 13 | Allyl Methacrylate | clear | 48.4 | 120 | 1.3 | 74 |
| 14 | Tert-butyl Methacrylate | clear | 32.2 | 115 | 1.4 | 79 |
| 15 | Methyl Methacrylate:t.-Octyl Methacrylate, 1:1 | clear | 30.5 | 127 | 1.4 | 78 |
| 16 | Isopropyl Methacrylate | clear | 41.0 | 112 | 1.2 | 77 |
| 17 | Glycidyl Methacrylate 18%, Methyl Methacrylate 48% | hazy | 27.3 | 132 | 1.2 | 78 |

The following examples show the effect of polysiloxane-macromer-content on $O_2DK$ and wettability.

EXAMPLES 18-26

Following the procedure described in the previous Examples 2-17 the macromer prepared in Example 1 is mixed with various amounts of monomers as shown in Table 2 and mixture polymerized into 0.1 mm and 1.0 mm thick films. The polymers are tested as described for oxygen permeability and wettability.

TABLE 2

Effect of % Polysiloxane Macromer (Si—Mac) on Physical Properties

| Ex. | Composition (%)[a] | | | | $O_2DK$ | Octane/Water Contact Angle |
|---|---|---|---|---|---|---|
| | Si—Mac | MMA | CYMA | HEMA | | |
| 18 | 8 | 91 | — | 1 | 1.1 | 100 |
| 19 | 16 | 87 | — | 2 | 7.8 | 122 |
| 20 | 24 | 73 | — | 3 | 17 | 122 |
| 21 | 32 | 64 | — | 4 | 21 | 124 |
| 22 | 40 | 55 | — | 5 | 57 | 146 |
| 23 | 48 | 46 | — | 6 | 69 | 146 |
| 24 | 24 | — | 73 | 3 | 8 | 100 |
| 25 | 32 | — | 64 | 4 | 17 | 116 |
| 26 | 40 | — | 55 | 5 | 34 | 121 |

[a]MMA is methyl methacrylate.
CYMA is cyclohexyl methacrylate.
HEMA is 2-hydroxyethyl methacrylate.

EXAMPLES 27-29

The following examples show the effect of using a hydrophilic comonomer (dimethylacrylamide). The same procedures described in Examples 18-26 are followed.

| Ex. | Composition | | | | $O_2DK$ | Octane/Water Contact angle | Water Content at equilibrium swelling, (%) |
|---|---|---|---|---|---|---|---|
| | Si Mac % | Comonomer % | HEMA % | DMA % | | | |
| 27 | 32 | MMA 54 | 4 | 10 | 35 | 111 | 5.7 |
| 28 | 32 | CYMA 54 | 4 | 10 | 36 | 120 | 2.0 |
| 29 | 32 | CYMA 54 | 4 | 20 | 34 | 117 | 6.7 |

DMA is dimethylacrylamide.

EXAMPLES 30-34

The following examples show the effect of additional crosslinking agents on $O_2DK$, wettability and hardness.

Following the procedure described in Examples 2-17 the macromer prepared in Example 1 was mixed with comonomers in ratios shown in the Table. The mixtures were polymerized and tested as described.

| Ex. | Composition[a] | | | HEMA % | $O_2DK$ | Octane/Water Contact angle | Shore D Hardness |
|---|---|---|---|---|---|---|---|
| | Si Mac % | Comonomers, % | | | | | |
| 30 | 30 | MMA 50 | NPDA 16 | 4 | 37.7 | 124 | 78 |
| 31 | 30 | MMA 41 | NPDA 25 | 4 | 34.4 | 131 | 82 |
| 32 | 30 | CYMA 50 | NPDA 16 | 4 | 27.5 | 125 | 78 |
| 33 | 30 | IBMA 50 | NPDA 16 | 4 | 31.8 | 120 | 82 |
| 34 | 30 | IBMA 25 CYMA 25 | EGDA 16 | 4 | 33.4 | 122 | 77 |

[a]IBMA is isobutyl methacrylate.
NPDA is neopentylene glycol diacrylate.
EGDA is ethylene glycol dimethacrylate.

EXAMPLES 35-38

The procedure of Example 1 is repeated, but the amount of isophorone diisocyanate (IPDI) is increased from 0.0945 moles (corresponding to a 5% molar excess of NCO/OH) to

| | |
|---|---|
| 0.105 (16.7% molar excess of NCO) | Ex: 35 |
| 0.166 (84.4% molar excess of NCO) | Ex: 36 |
| 0.243 (170.0% molar excess of NCO) | Ex: 37 |
| 0.335 (272.2% molar excess of NCO) | Ex: 38 |

After reaction of the NCO-terminated prepolymer with HEMA a mixture of 30 parts methacrylate terminated polysiloxane, 4 parts HEMA, and 1, 5, 10 and 16 parts of the reaction product of 2 moles HEMA and 1 mol IPDI (IPDI-dihema) is obtained, as determined by gel permeation chromatography. The mixtures are diluted with methyl methacrylate and cast in form of clear buttons, sheets and films with the following properties:

| Ex. No. | Composition, % | | | | $O_2.DK$ | Octane/Water Contact Angle | Shore-D Hardness |
|---|---|---|---|---|---|---|---|
| | Si—Mac | MMA | HEMA | IPDI-dihema | | | |
| 35 | 36 | 65 | 4 | 1 | 26.5 | 126 | 79 |
| 36 | 30 | 61 | 4 | 5 | 25.6 | 117 | 81 |
| 37 | 30 | 56 | 4 | 10 | 26.2 | 121 | 79 |
| 38 | 30 | 50 | 4 | 16 | 25.4 | 112 | 77 |

The following examples demonstrate the usefulness of the polysiloxane-urethane-methacrylate in preparing clear and soft oxygen permeable polymers (with Young's Modulus <1.) for use as soft contact lenses.

EXAMPLES 39-44

The polysiloxane macromer of Example 1 is diluted with various comonomers and 0.1% IRGACURE-184 and polymerized by exposure to UV as described in Examples 2-17. Compositions and properties are shown below.

| Ex. | Composition (4% HEMA) Si—Mac % | Comonomer Methyacrylate Esters | % | Appearance, feel | $O_2.DK$ | Young's Mod. (GPa) | Octane/Water Contact Angle |
|---|---|---|---|---|---|---|---|
| 39 | 30 | n-butyl- | 66 | clear, soft | 39 | 0.7 | 130 |
| 40 | 30 | n-hexyl- | 66 | clear, soft | 39 | 0.3 | 136 |
| 41 | 30 | n-octyl- | 66 | clear, soft | 38 | $<10^{-3}$ | 92 |
| 42 | 30 | sec.butyl- | 66 | clear, soft | 29 | 0.8 | 124 |
| 43 | 30 | 2-ethylhexyl- | 66 | clear, soft | 32 | $<10^{-3}$ | 115 |
| 44 | 30 | pentamethyl-disiloxanylpropyl + methyl-(1:1) | 33: 33 | clear, soft | 43 | 1.0 | 122 |

EXAMPLES 45–48

The polysiloxane macromer of Ex. 1 is diluted with various comonomers and 0.2% IRGACURE-184 and polymerized by exposure to UV as described in Examples 2–17. Clear polymers are obtained, whose compositions and properties are shown below:

| Ex. | Composition (%) Si—Mac | Hema | Comonomers[a] | | $O_2.DK$ | Octane/Water Contact Angle |
|---|---|---|---|---|---|---|
| 45 | 50 | 10 | methyl-MA | 40 | 66 | 135 |
| 46 | 50 | 10 | methyl-MA 2-ethylhexyl-A | 20 20 | 99 | 143 |
| 47 | 50 | 10 | 2-ethylhexyl-A +glycidyl-MA | 20 20 | 83 | 138 |
| 48 | 60 | — | 2-ethylhexyl-A +glycidyl-MA | 20 20 | 89 | 141 |

[a]MA: methacrylate; A: acrylate

The following examples demonstrate the usefulness of active hydrogen containing monomers other than HEMA for preparing the polysiloxane prepolymer.

EXAMPLES 49–55

The procedure of Example 1 is repeated, but instead of HEMA the equivalent amounts of other active hydrogen containing vinyl monomers are used to end-cap the NCO-terminated polysiloxane prepolymer. Completion of the final capping step is verified by IR-spectroscopy. In this way the following vinyl-terminated polysiloxanes are prepared as clear, viscous liquids.

| Ex. | Active H—containing vinyl monomer: | Abbreviation |
|---|---|---|
| 49 | 2-hydroxyethyl acrylate | HEA |
| 50 | 2-hydroxypropyl acrylate | HPA |
| 51 | 4-hydroxybutyl vinyl ether | HBVE |
| 52 | 3-hydroxypropyl butyl fumarate | HPBF |
| 53 | t-butylaminoethyl methacrylate | BAEM |
| 54 | allyl alcohol | ARA |
| 55 | methallyl alcohol | MALA |

The following examples show the usefulness of polysiloxanes with methacrylyl, vinyl ether and fumarate unsaturation in preparing clear, hard and $O_2$-permeable polymers.

EXAMPLES 56–60

The vinyl-terminated polysiloxanes of Examples 45–47 are diluted with monomers and polymerized in form of clear films and buttons, using 0.02% IRGACURE-184 as initiator. The compositions and their physical properties are listed in the following table.

| Ex. | Polydimethyl siloxane Capped with[1] | % | Comonomers | % | $O_2DK$ | Shore-D Hardness |
|---|---|---|---|---|---|---|
| 56 | BAEM (Ex. 53) | 33 | Cyclohexyl Methacrylate | 67 | 19.4 | 77 |
| 57 | BAEM (Ex. 53) | 33 | Methyl-Methacrylate | 67 | 31.3 | 79 |
| 58 | BAEM (Ex. 53) | 33 | Vinyl Acetate | 67 | 92.0 | 60 |
| 59 | HBVE (Ex. 51) | 33 | Vinyl Acetate | 67 | 20.6 | 83 |
| 60 | HPBF (Ex. 52) | 16 | Vinyl Acetate Dimethyl maleate Cyclohexyl Methacrylate HPBF | 40 30 7 7 | 10.5 | 80 |

[1]See Ex. 49–55 for abbreviations.

EXAMPLE 61

Following the procedure of Ex. 1, polydimethylsiloxane triol (DOW CORNING fluid '1248') is end-capped with isophorone diisocyanate. A 10% molar excess of methacrylic acid is added, together with 0.05% cobalt naphthenate. $CO_2$ is evolved and the mixture is kept at 50° C. for 6 hours after which time the percent NCO value has dropped to almost zero. The mixture is diluted with 70% methyl methacrylate; 0.1% IRGACURE 184 is added and polymer sheets and films are prepared as described in Example 2. The polymer is hazy-white, has an $O_2DK$ of 68 and an octane/water contact angle of 103°.

EXAMPLE 62

Following the procedure, of Examples 1 and 2, a polymer is prepared using 2,2,4(2,4,4)-trimethylhexane-1,6-diisocyanate instead of IPDI. A polymer with essentially identical properties to the one of Example 2 is obtained.

The following examples show the usefulness of fluorinated comonomers in perparing the clear, oxygen permeable polymers of this invention.

EXAMPLES 63–68

Following the procedure of Examples 1 and 2 the following polymers are prepared and their oxygen permeability is measured.

| Ex. | % Si—Mac of Ex. 1 | Fluorinated Comonomer | | % | Other Comonomers | % | $O_2.DK \times 10^{-10}$ |
|---|---|---|---|---|---|---|---|
| 63 | 30 | hexafluoroisopropyl | MA | 66 | hema | 4% | 59.6 |
| 64 | 8 | hexafluoroisopropyl | MA | 27.8 | hema | 0.6% | 28.0 |
|    |    | $C_8F_{17}(CH_2)_2S(CH_2)_3$— | MA | 27.2 | CYMA | 36.4% |    |
| 65 | 30 | hexafluoroisopropyl | MA | 32 | hema | 4% | 71.7 |
|    |    | $C_8F_{17}(CH_2)_2S(CH_2)_3$— | MA | 32 |    |    |    |
| 66 | 26 | hexafluoroisopropyl | MA | 19 | hema | 4% | 40.6 |
|    |    | $C_8F_{17}(CH_2)_2S(CH_2)_3$— | MA | 19 | CYMA | 30% |    |
| 67 | 30 | $C_8F_{17}(CH_2)_2S(CH_2)_3$— | MA | 33 | hema, | 4% | 62.7 |
|    |    | trifluoroethyl- | MA | 33 |    |    |    |
| 68 | 30 | $C_8F_{17}(CH_2)_2S(CH_2)_3$— | MA | 16.5 | hema | 4% | 41.8 |
|    |    | trifluoroethyl- | MA | 16.5 | CYMA | 33% |    |

All samples are completely clear.

The following example shows that the clarity of polymers of Examples 63–68 is an unexpected result since analogous compositions containing no silicone give incompatible mixtures and weak, opaque polymers:

EXAMPLE 69

Example 63 is repeated, but the siloxane macromer of Example 1 is replaced by an analogous macromer obtained by reacting 1 mol poly-tetramethyleneoxide diol (2000 MW) with 2 mol isophorone diisocyanate, followed by end-capping with excess HEMA. An incompatible mixture results which phase-separates on standing and during polymerization. The polymer sheet obtained is opaque, brittle and very weak.

The following examples demonstrate the use of other polysiloxanes in preparing the instant polymers.

EXAMPLE 70

Following the procedure of Example 1, 21.7 g (0.025 m) polydimethylsiloxane diol (DOW CORNING fluid Q4-3557) are reacted with 11.7 g (0.0526 m) isophorone diisocyanate. After stirring under nitrogen for 5 hours at 50° C., the NCO content drops to 6.80% (6.90% theoretical).

Then 22.3 g of this polydimethylsiloxane diisocyanate prepolymer are diluted with 5.2 g 2-hydroxyethyl methacrylate (HEMA) and stirred at room temperature under nitrogen until all NCO has reacted. The clear, methacrylate-capped polysiloxane is stored cold under nitrogen. It consists of 98.2% methacrylate terminated polysiloxane and 1.8% unreacted HEMA.

Subsequently, 20 g of the polysiloxane-dimethacrylate prepolymer thus prepared are diluted with 20 g methyl methacrylate. 0.04 g IRGACURE 184 is mixed in and the mixture is degassed in vacuo. Using the procedure described in Example 2, samples are cast as 0.1 and 1.0 mm thick films and sheets and in form of cylindrical buttons of 14 mm diameter. The clear polymer has the following properties.

| | |
|---|---|
| $O_2.DK$: | 8 |
| Hardness Shore-D: | 95 |
| Octane/Water: Contact Angle | 125 |

EXAMPLE 71

Following the procedure of Example 1, 28.98 g (0.015 m) of a polydimethylsiloxane (PDMS)-polyethylene oxide (PEO) block copolymer of structure PEO-PDMS-PEO, having an equivalent weight of 966 (DOW CORNING fluid Q4-3667) are reacted with 6.80 g (0.0306 m) isophorone diisocyanate (IPDI). After stirring under nitrogen for 1 hour at 50° C., the NCO content drops to 3.87% (3.65% theoretical) (or 0.330 equivalents of —NCO).

Then 28.72 g of this NCO-capped prepolymer are mixed with 6.10 g (0.033 m) t-butylaminoethyl methacrylate (BAEM) and stirred at room temperature under nitrogen until all NCO has reacted. Completion of the reaction is verified by IR-spectroscopy. The clear, viscous methacrylate-capped PDMS prepolymer is diluted with 35.2 g methyl methacrylate and 0.14 g IRGACURE-184 is added. After thorough mixing, the mass is cast in form of sheets and films and polymerized through exposure to UV light.

The clear and tough polymer consists of 50% methacrylate-capped polysiloxane prepolymer and 50% methyl methacrylate; swollen to equilibrium it contains 9% water and has the following oxygen permeability: $O_2.DK = 12.3$ (9% $H_2O$); 24.3 (dry).

EXAMPLE 72

Following the procedure of Example 1, 41.0 g (0.015 m) of a polydimethylsiloxane (PDMS)-dithiol of equivalent weight 1367 (DOW CORNING X2-8024) are reacted with 6.80 g (0.0306 m) IPDI, using 0.02 mg of triethylamine as catalyst. After stirring under nitrogen for 1½ hours at 24°–28° C., the NCO-content drops to 2.83% (2.74% theoretical).

Then 44.22 g of this NCO-capped prepolymer are mixed with 5.96 g of t-butylaminoethyl methacrylate and stirred at room temperature under nitrogen until all NCO has reacted. Completion of the reaction is verified by IR-spectroscopy. The clear, viscous methacrylate capped PDMS-prepolymer is diluted with 0.5 g HEMA and 115 g methyl methacrylate, and 0.1 g IRGACURE-184 is added. After thorough mixing, the mixture is cast in form of sheets and films and polymerized by exposure UV-light.

The clear polymer which consisted of 69% methacrylate capped polysiloxane prepolymer, 30.7% MMA and 0.3% HEMA has the following properties:

| | |
|---|---|
| $O_2.DK$: | 23 |
| Shore-D: | 75 |
| Octane/water: Contact Angle | 110 |

The following example shows the synthesis of a polymer with a chain extended polysiloxane.

EXAMPLE 73

Following the procedure of Example 1, 54.66 g (0.02 m) of a polydimethylsiloxane (PDMS)-dithiol of equivalent wt. 1367 (Dow Corning X8024) are reacted with 2.10 g (0.01 m) of 2,2,4-trimethylhexane-1,6,-diisocyanate (TMDI) using 0.020 g of triethylamine as catalyst. After stirring overnight at room temperature (24° C.) and under $N_2$, an IR scan shows that all isocyanate groups have reacted indicating that chain extension of two molecules of polydimethylsiloxane dithiol with one molecule of TMDI has occurred. 56.8 g (0.01 m) of this chain extended dithiol are reacted with 4.53 g (0.0204 m) of IPDI. The reaction mixture is stirred at 24° C. for 1½ hours at which time to —NCO content has dropped to 1.49% (1.43% theoretical). 57.2 g of this NCO-capped prepolymer are mixed with 3.75 g of t-butyl aminoethylmethacrylate and stirred at 24° C. until all NCO has reacted as confirmed by IR-spectroscopy.

15 g of the methacrylate capped PDMS prepolymer are mixed with 35 g of methyl methacrylate and 0.05 g of IRGACURE 184. The mixture is cast in the form of sheets and films or buttons and polymerized by exposure to UV light as described in Example 2. The slightly hazy polymer has the following properties:

$O_2DK$ 34
Shore-D hardness 67
octane/water contact angle 110°

The following examples demonstrate the superiority of polymers containing urethane groups over polymers containing no urethane groups.

EXAMPLES 74–76

Polydimethylsiloxane-methacrylates, bearing methacrylate groups pendant to the main chain and attached to it through carbinol-ester linkages, and which are available from PETRARCH Chem. Co. under the code:

| Example | Code | Equivalent Weight |
|---------|--------|-------------------|
| 74 | PS-486 | 1058 |
| 75 | PS-429 | 2735 | are diluted to 30% with 4% HEMA and 66% cyclohexyl methacrylate. To each 0.1% IRGACURE-184 is added and the mixtures are polymerized by exposure to UV in form of 0.1 mm and 1.0 mm thick films and sheets. The results are shown in the following table.

Methacrylate esters prepared by esterification of the polydimethylsiloxane-triol (1248) with methacryloyl chloride and which are therefore similar to the polysiloxane-methacrylate of Example 1 except for the absence of urethane groups, give likewise opaque and weak polymers when formulated and polymerized in manner described above (Ex. 76).

| Ex. | Appearance | $O_2DK$ | Shore-D |
|-----|------------|---------|---------|
| 74 | hazy, brittle | 25 | 78 |
| 75 | severe phase-separation; cheesy; poorly polymerized | could not be measured | |
| 76 | opaque, brittle; poorly polymerized | 40 | — |

The following example demonstrates the usefulness as well as the superiority of hard contact lenses made from the polymers of this invention over materials of the prior art.

EXAMPLE 77

Round polymer buttons of Examples 30 and 33, cast in the manner described in Example 2, having 15 mm diameter and 8 mm height, are fabricated into contact lens shapes by lathing and polishing, using conventional techniques of hard contact-lens manufacturing. Machinability, surface gloss, hardness, scratch resistance, and dimensional stability and clarity of all samples are excellent and no change in base curve upon hydration was observed.

One polymer button of Example 30 is machined into a shape to fit the electrode of an oxygen permeability apparatus. $O_2$-permeability is measured and compared to Prior-Art materials which also have good dimensional stability and are offered as oxygen permeable, hard contact lens materials:

| Material | $O_2DK$ | Structure of Silicone Units |
|----------|---------|-----------------------------|
| Polymer of Ex. 30 | 27 | as defined by this patent |
| Polycon[1] | 4 | pendent oligosiloxane groups derived from oligosiloxanyl-alkyl methacrylates |
| SILICON[2] | 8 | Silicone-rubber based |
| Cellulose-acetate-butyrate | 8 | no silicone present |

[1] from SYNTEX Corp.
[2] from DOW CORNING Corp.

None of the other synthetic approaches to make Si-containing contact lenses produces materials with as high an oxygen permeability as can be achieved with polymers of this invention while at the same time maintaining the hardness necessary for machining and polishing.

What is claimed is:

1. A polymer, suitable for use in contact lenses, comprising the crosslinked copolymerization product of
   (A) from about 15 to about 60% by weight of said polymer of a linear or branched polysiloxane macromer having a molecular weight from about 400 to about 100,000, as measured by end group analysis or gel permeation chromatography, said macromer containing at least two terminal or pendant, polymerizable olefinic groups per each 5000 molecular weight unit of polysiloxane, said groups being attached to the polysiloxane through at least two urethane, thiourethane, urea or amide linkages, said macromer having the structure $A_1$ or $A_2$,

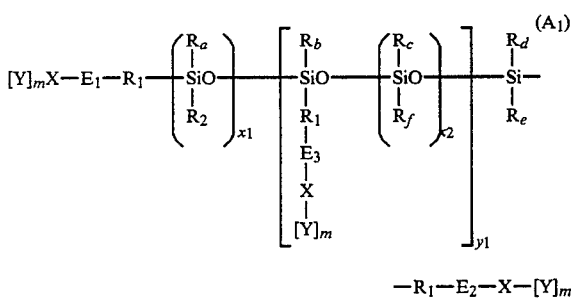

or

-continued

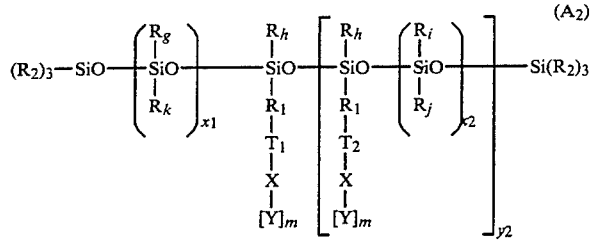
(A2)

wherein:
R$_1$ is a linear or branched alkylene group with 2-6 carbon atoms or a polyoxyalkylene group of structure G

(G)

wherein R$_3$ is hydrogen or methyl and n is an integer from 1-50 or R$_2$, R$_a$, R$_b$, R$_c$, R$_d$, R$_e$, F$_f$, R$_g$, R$_h$, R$_i$, R$_j$, and R$_k$ are independently methyl or phenyl, x$_1$ and X$_2$ are integers from 1 to 500 with the provison that the sum of x$_1$ + x$_2$ is 7 to 1000, y$_1$ is 0 to 14 and y$_2$ is 1 to 13 with the proviso that the ratio of $$\frac{x_1 + x_2}{y_1 + 2} \text{ or } \frac{x_1 + x_2}{y_2 + 1}$$

is not greater than 70,
E$_1$, E$_2$, E$_3$, T$_1$ and T$_2$ are each a direct bond,
m is 1 or 2,
x is a di- or tri-radical:

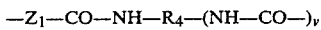

wherein v=1 or 2, Z$_1$ is oxygen, sulfur or NR$_5$, wherein R$_5$ is hydrogen or lower (C$_1$-C$_4$) alkyl, Z$_1$ is connected to R$_1$; and R$_4$ is a di- or triradical obtained by removing the NCO-groups from an aliphatic, cycloaliphatic or aromatic di- or triisocyanate;
Y is:

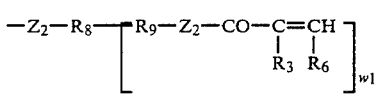
(I)

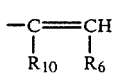
(II)

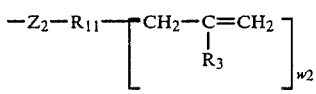
(III)

or
—O—R$_7$—O—CH$_2$=CH$_2$ (IV)

wherein:
R$_6$ is: hydrogen, methyl, —COOR$_5$ or —COOR$_7$OH with the proviso that if R$_6$ is other than hydrogen, m and w$_1$ are each 1; and R$_8$ is a direct bond;
Z$_2$=oxygen or —NR$_5$—
R$_7$ is a linear or branched alkylene of 2 to 10 carbon atoms, phenylene or phenylalkylene with 2 to 10 carbon atoms in the alkylene, or polyoxyalkylene of structure G,
R$_8$ is R$_7$ or a tri- or tetra radical residue with 2-4 carbon atoms;
w$_1$ is 1 to 3;
R$_9$ is an alkylene group of from 2 to 4 carbon atoms or a direct bond with the proviso that if w$_1$=1, R$_9$ is a direct bond, and it follows that R$_8$ is a di-radical;
R$_{10}$ is hydrogen, methyl or —CH$_2$COOH, with the proviso that if R$_{10}$ is —CH$_2$COOH, R$_6$ is hydrogen;
R$_{11}$ is a direct bond or an aliphatic di-, tri- or tetra-radical with from 1-6 carbon atoms, and
w$_2$ is 1 to 3, with the proviso that if R$_{11}$ is a direct bond, w$_2$ is 1, and
(B) about 85 to about 40% by weight of said polymer of a mixture of water-soluble and water-insoluble monomers or water-insoluble monomers, said monomers being monoolefinic, diolefinic or a mixture of monoolefinic and diolefinic monmers, with from 85 to 100% by weight of the total monomers being water-insoluble, and with from 25 to 0% by weight of the total monomers being diolefinic.

2. A polymer according to claim 1 where in the polysiloxane of structure A$_1$ or A$_2$, R$_1$ is alkylene of 3 or 4 carbon atoms, R$_2$, R$_a$, R$_b$, R$_c$, R$_d$, R$_e$, R$_f$, R$_g$, R$_h$, R$_i$, R$_j$ and R$_k$ are each methyl, x$_1$+x$_2$ is 10 to 100, y$_1$ is 0 to 2, y$_2$ is 1 to 3, m is 1, E$_1$, E$_2$, E$_3$, T$_1$ and T$_2$ are each a direct bond, X is —Z$_1$—CONH—R$_4$—NHCO— where Z$_1$ is —O— or —NH— and R$_4$ is a diradical of an aliphatic or cycloaliphatic diisocyanate with 6 to 10 carbon atoms, and Y is

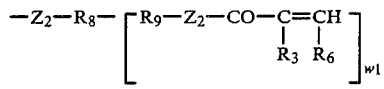

wherein R$_6$ is hydrogen, R$_8$ is ethylene, R$_9$ is a direct bond, w$_1$ is 1 and Z$_2$ is —O— or —NC(CH$_3$)$_3$—.

3. A polymer according to claim 2 where the polysiloxane is of structure A$_2$, R$_4$ is the diradical derived from isophorone diisocyanate, Z$_1$ and Z$_2$ are each —O—, and y$_2$ is 1 or 2.

4. A polymer according to claim 1 wherein the component (B) is present at the 85 to 50% by weight level of the total polymer.

5. A polymer according to claim 1 wherein component B is a water insoluble monomer B$_1$ which is an acrylate or methacrylate of formula CH$_2$=CR$_3$COOR$_{12}$, an acrylamide or methacrylamide of formula CH$_2$=CR$_3$CONHR$_{12}$, a maleate or fumarate of formula R$_{12}$OCOCH=CHCOOR$_{12}$, an itaconate of formula R$_{12}$OCOC(=CH$_2$)CH$_2$COOR$_{12}$, a vinyl ester of formula R$_{12}$COOCH=CH$_2$, a vinyl ether of formula CH$_2$=CHOR$_{12}$, or a mixture of said monomers, wherein R$_3$ is hydrogen or methyl, and R$_{12}$ is a linear or branched aliphatic, cycloaliphatic or aromatic alkyl group with from 1 to 21 carbon atoms and which may contain ether or thioether linkages or a —CO— group; or is a heterocyclic alkyl group containing oxygen, sulfur or nitrogen atoms, or a polypropylene oxide or poly-n-butylene oxide group with from 2 to 50 repeating alkoxy units; or is perfluorinated alkyl groups with from 1-12 carbon atoms; or is alkyl containing siloxane groups with from one to six Si atoms; or —SO— and —SO$_2$— groups.

6. A polymer according to claim 5 wherein the water insoluble monomer B$_1$ is selected from the group consisting of methyl methacrylate, isopropyl methacrylate, isobutyl methacrylate, tert-butyl methacrylate, isobornyl methacrylate, cyclohexyl methacrylate, hexafluoroisopropyl methacrylate and mixtures thereof.

7. A polymer according to claim 6 wherein the water insoluble monomer $B_1$ is selected from the group consisting of methyl methacrylate, isopropyl methacrylate, isobutyl methacrylate, isobornyl methacrylate and mixtures thereof.

8. A polymer according to claim 1 wherein component (B) contains 1 to 25%, based on the total weight of monomer, of a diolefinic monomer.

9. A polymer according to claim 1 wherein diolefinic monomer ($B_x$) of component B is the acrylate or methacrylate of allyl alcohol, of a straight or branched chain alkylene glycol of 2 to 6 carbon atoms, of poly(ethylene oxide)glycol, of poly(propylene oxide)glycol, of poly(n-butylene oxide)glycol, of thiodiethylene glycol, of neopentylene glycol, of trimethylolpropane, or of pentaerthyritol; or the reaction product obtained by reacting one mol of a di- or tri-isocyanate of structure OCN—$R_4$—(NCO)$_v$, where $R_4$ is defined as in claim 1 and v is 1 or 2, with 2 or 3 moles of a hydroxyalkyl acrylate or methacrylate.

10. A polymer according to claim 1 wherein component B is a mixture of methyl methacrylate and 1 to 25% by weight of the total monomer of neopentylene glycol diacrylate, ethylene glycol dimethacrylate or the reaction product of one mol of isophorone diisocyanate and two moles of 2-hydroxyethyl methacrylate.

11. A polymer according to claim 5 wherein the water insoluble monomer $B_1$ is a mixture of vinyl acetate and dimethyl maleate in a 2/1 to 5/1 mol ratio plus methyl methacrylate, isopropyl methacrylate, isobutyl methacrylate, tert-butyl methacrylate, cyclohexyl methacrylate or hexafluoroisopropyl methacrylate or mixtures thereof.

12. A polymer according to claim 5 wherein the water insoluble monomer $B_1$ is selected from the group consisting of 2-ethylhexyl acrylate, 2-ethylhexyl methacrylate, n-butyl acrylate, n-butyl methacrylate, n-octyl acrylate, n-octyl methacrylate, n-decyl acrylate, n-decyl methacrylate, perfluoroalkyl ($C_6$–$C_{10}$) substituted alkyl acrylate or methacrylate; and mixtures thereof.

13. A polymer according to claim 1 where in component B the water soluble monomer $B_2$ is an acrylate or methacrylate of formula $CH_2=CR_3COOR_{13}$, an acrylamide or metharylamide of formula $CH_2=CR_3CONHR_{14}$ or $CH_2=CR_3CON(R_5)_2$, a maleate or fumarate of formula $R_{13}OCOCH=CHCOOR_{13}$, a vinyl ether of formula $CH_2=CHOR_{13}$, an N-vinyl lactam; or a mixture of said monomers, wherein $R_3$ is hydrogen or methyl, $R_5$ is hydrogen or lower ($C_1$-$C_4$) alkyl, $R_{13}$ is a hydrocarbon residue of 1 to 10 carbon atoms substituted by one or more water solubilizing groups such as carboxy, hydroxy or tert.-amino, or a polyethylene oxide group with from 2–100 repeating units, or a group which contains sulfate, phosphate, sulfonate or phosphonate groups, and $R_{14}$ is defined as $R_{13}$ or as $R_5$.

14. A polymer according to claim 13 wherein the water soluble monomer $B_2$ is selected from the group consisting of 2-hydroxyethyl methacrylate, N,N-dimethylacrylamide, acrylic acid, methacrylic acid and N-vinyl-2-pyrrolidone.

15. A polymer according to claim 1 where component A is a polysiloxane structure of $A_1$ or $A_2$, $R_1$ is alkylene of 3 or 4 carbon atoms, $R_2$, $R_a$, $R_b$, $R_c$, $R_d$, $R_e$, $R_f$, $R_g$, $R_h$, $R_i$, $R_j$ and $R_k$ are each methyl, $x_1 + x_2$ is 10 to 100, $y_1$ is 0 to 2, $y_2$ is 1 to 3, m is 1, $E_1$, $E_2$, $E_3$, $T_1$ and $T_2$ are each a direct bond, X is —$Z_1$—CONH—$R_4$—NH-CO— where $Z_1$ is —O— or —NH— and $R_4$ is a diradical of an aliphatic or cycloaliphatic diisocyanate with 6 to 10 carbon atoms, and Y is

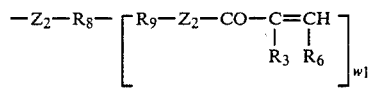

wherein $R_6$ is hydrogen, $R_8$ is ethylene, $R_9$ is a direct bond, $w_1$ is 1 and $Z_2$ is —O— or —NC(CH$_3$)$_3$—, and component B contains from 0 to 25% based on total monomer of a diolefinic monomer ($B_x$) which is the acrylate or methacrylate of allyl alcohol, of a straight or branched chain alkylene glycol of 2 to 6 carbon atoms, of poly(ethylene oxide)glycol, of poly(propylene oxide)glycol, of poly(n-butylene oxide)glycol, of thiodiethylene glycol, of neopentylene glycol, of trimethylolpropane, or of pentaerthyritol; or the reaction product obtained by reacting one mol of a di- or tri-isocyanate of structure OCN—$R_4$—(NCO)$_v$, where $R_4$ is defined as in claim 1 and v is 1 or 2, with 2 or 3 moles of a hydroxyalkyl acrylate or methacrylate.

16. A polymer according to claim 15 wherein $B_x$ is neopentylene glycol diacrylate, ethylene glycol dimethacrylate or the reaction product of one mol of isophorone diisocyanate and two moles of 2-hydroxyethyl methacrylate.

17. A polymer according to claim 15 wherein component B contains the water insoluble monomer $B_1$ selected from the group consisting of methyl methacrylate, isopropyl methacrylate, isobutyl methacrylate, tert-butyl methacrylate, isobornyl methacrylate, cyclohexyl methacrylate, hexafluoroisopropyl methacrylate and mixtures thereof.

18. A polymer according to claim 17 wherein component B contains the water insoluble monomer $B_1$ selected from the group consisting of methyl methacrylate, isopropyl methacrylate, isobutyl methacrylate, cyclohexyl methacrylate isobornyl methacrylate and mixtures thereof.

19. A polymer according to claim 16 wherein component B contains as the water insoluble monomer $B_1$ methyl methacrylate, isobornyl methacrylate or mixtures thereof.

20. A polymer according to claim 15 wherein component B contains the water insoluble monomer $B_1$ which is a mixture of vinyl acetate and dimethyl maleate in a 2/1 to 5/1 mol ratio plus methyl methacrylate, isopropyl methacrylate, isobutyl methacrylate, tert-butyl methacrylate, cyclohexyl methacrylate or hexafluoroisopropyl methacrylate or mixtures thereof.

21. A polymer according to claim 15 wherein component B contains the water insoluble monomer $B_1$ selected from the group consisting of 2-ethylhexyl acrylate, n-butyl acrylate, n-butyl methacrylate, n-octyl acrylate, n-octyl methacrylate, n-decyl acrylate, n-decyl methacrylate, perfluoroalkyl ($C_6$–$C_{10}$) substituted alkyl acrylate or methacrylate; and mixtures thereof.

22. A polymer according to claim 15 wherein component B contains the water soluble monomer $B_2$ selected from the group consisting of 2-hydroxyethyl methacrylate, N,N-dimethylacrylamide, acrylic acid, methacrylic acid and N-vinyl-2-pyrrolidone.

23. A polymer according to claim 15 which comprises
(A) from about 15 to about 35% by weight of a polysiloxane of structure $A_2$, $R_4$ is the diradical derived from isophorone diisocyanate, $Z_1$ and $Z_2$ are each —O—, and $y_2$ is 1 or 2, and
(B) from about 85 to about 65% by weight of a mixture of a water-insoluble monomer ($B_1$), of a water-soluble monomer ($B_2$), and of a diolefinic monomer ($B_x$), wherein, based on percent by weight of the total weight of monomers,
$B_1$ is from about 60 to about 95% of a water-insoluble monomer selected from the group consisting of methyl methacrylate, isopropyl methacrylate, isobutyl methacrylate, tert-butyl methacrylate, cyclohexyl methacrylate, isobornyl methacrylate and mixtures thereof,
$B_2$ is from about 15 to about 0% of a water-soluble monomer selected from the group consisting of 2-hydroxyethyl methacrylate, N,N-dimethylacrylamide, acrylic acid, methacrylic acid, N-vinyl-2-pyrrolidone and mixtures thereof, and
$B_x$ is from about 25 to about 5% of a diolefinic monomer selected from the group consisting of neopentylene glycol diacrylate, ethylene glycol dimethacrylate and the reaction product of one mol of isophorone diisocyanate and two moles of 2-hydroxyethyl methacrylate.

24. A polymer according to claim 15 which comprises
(A) from about 40 to about 60% by weight of a polysiloxane of structure $A_2$, $R_4$ is the diradical derived from isophorone diisocyanate, $Z_1$ and $Z_2$ are each —O—, and $y_2$ is 1 or 2, and
(B) from about 60 to about 40% by weight of a mixture of a water-insoluble monomer ($B_1$), of a water-soluble monomer ($B_2$), and of a diolefinic monomer ($B_x$), wherein, based on percent by weight of the total weight of monomers,
$B_1$ is from about 89 to about 100% of a water-insoluble monomer selected from the group consisting of ethyl acrylate or methacrylate, n-butyl acrylate or methacrylate, n-hexyl acrylate or methacrylate, 2-ethylhexyl acrylate or methacrylate, n-octyl acrylate or methacrylate, n-decyl acrylate or methacrylate and mixtures thereof and with mixtures thereof with methyl or isobornyl methacrylate,
$B_2$ is from about 11 to about 0% of a water-soluble monomer selected from the group consisting of 2-hydroxyethyl methacrylate, N,N-dimethylacrylamide, acrylic acid, methacrylic acid, N-vinyl-2-pyrrolidone and mixtures thereof, and
$B_x$ is from about 5 to about 0% of a diolefinic monomer selected from the group consisting of neopentylene glycol diacrylate, ethylene glycol dimethacrylate and the reaction product of one mol of isophorone diisocyanate and two moles of 2-hydroxyethyl methacrylate.

25. A hard contact lens prepared from the polymer according to claim 1.
26. A hard contact lens prepared from the polymer according to claim 23.
27. A soft contact lens prepared from the polymer according to claim 1.
28. A soft contact lens prepared from the polymer according to claim 24.

* * * * *